Sept. 2, 1941.  R. R. LOVE  2,254,690
HYDRAULIC LOADER
Filed March 25, 1941  2 Sheets-Sheet 1

Inventor
R. R. Love.
Mann, Anderson & Liddy
Attorneys

Sept. 2, 1941. R. R. LOVE 2,254,690
HYDRAULIC LOADER
Filed March 25, 1941 2 Sheets-Sheet 2
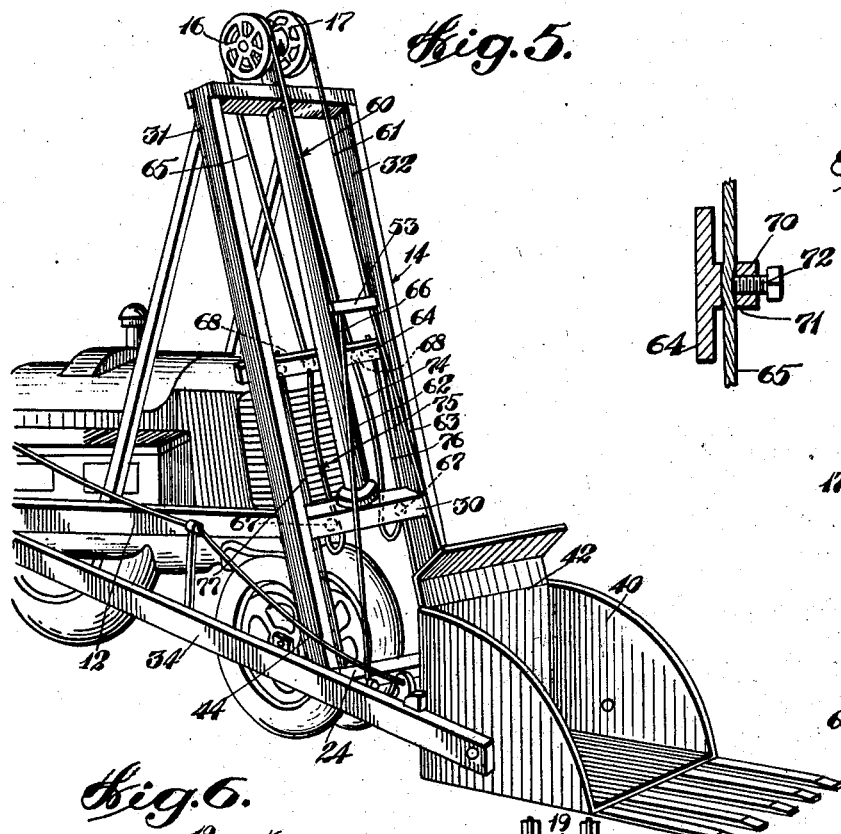
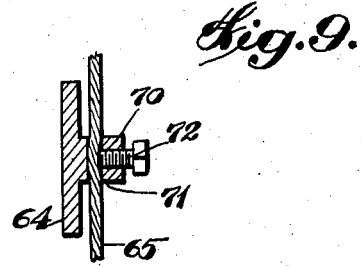
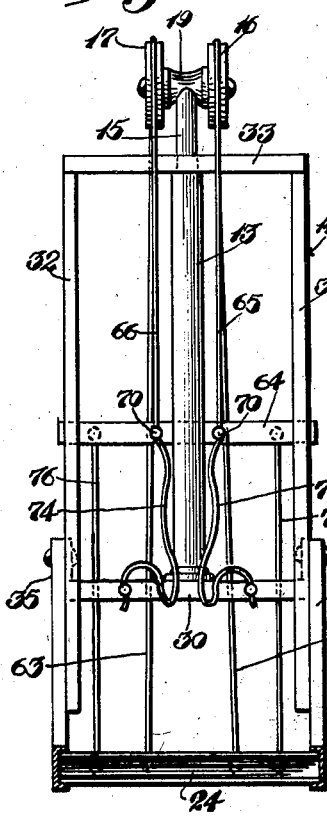
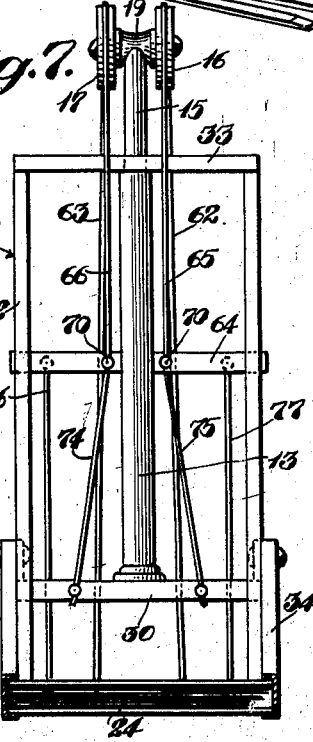
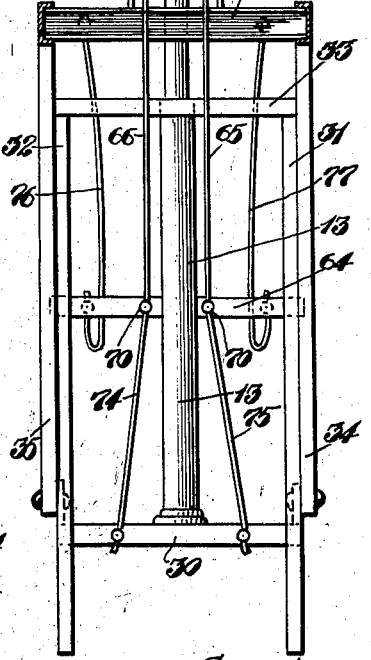

Patented Sept. 2, 1941

2,254,690

UNITED STATES PATENT OFFICE 2,254,690

HYDRAULIC LOADER

Richard R. Love, Buhl, Idaho

Application March 25, 1941, Serial No. 385,167

6 Claims. (Cl. 214—140)

This invention relates to an hydraulic operated loader.

An object of the invention is the provision of a loader in the form of a frame pivoted at one end to the fixed part of a tractor, a shovel being pivotally connected to the free end of the frame which is elevated by cables trained over pulleys carried on the upper end of an hydraulically operated piston, one end of each cable being connected to the frame while the other ends of the cable being connected to a movable device which is slidable on a fixed part of the tractor, said movable device having connections with the frame and also provided with means for limiting the upward movement thereof after the shovel has been raised to a predetermined height after which the second-mentioned ends of the cable will be rigidly held against movement so that the continued upward movement of the pulleys by the piston will cause the cables to elevate the shovel further and to a desired height, whence the shovel may be dumped by the release of a latching means which normally holds the shovel in an operative position on the frame.

A further object of the invention is the provision of a means for elevating a shovel whereby the opposite ends of the cables are compelled to exert equal lifting power on the shovel after the shovel has been forced into a mass of material on the ground by a tractor carrying the shovel, so that both ends of the cables will exert a direct pull on the shovel for loosening the shovel from the mass of material after which one end of similarly placed ends of each of the cables is held against movement so that further force which is applied to the intermediate portions of the cables by pulleys connected to a hydraulic lift will be expended on the other ends of the cables for completing the lift of the shovel, said shovel being carried by the free end of a frame pivotally mounted at the other end on a tractor.

This invention will be best understood from a consideration of the following detailed description in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 5 is a fragmentary view in perspective of a modified form of the hydraulic lifting means for raising the shovel.

Figure 6 is a transverse vertical section looking from the back towards the front of the truck showing the shovel in an inoperative position.

Figure 7 is a similar section showing the shovel partly elevated.

Figure 8 is a section similar to that shown in Figures 6 and 7 disclosing the shovel in its elevated position.

Figure 9 is a vertical section of a means for connecting the cable in fixed position.

Figure 1:
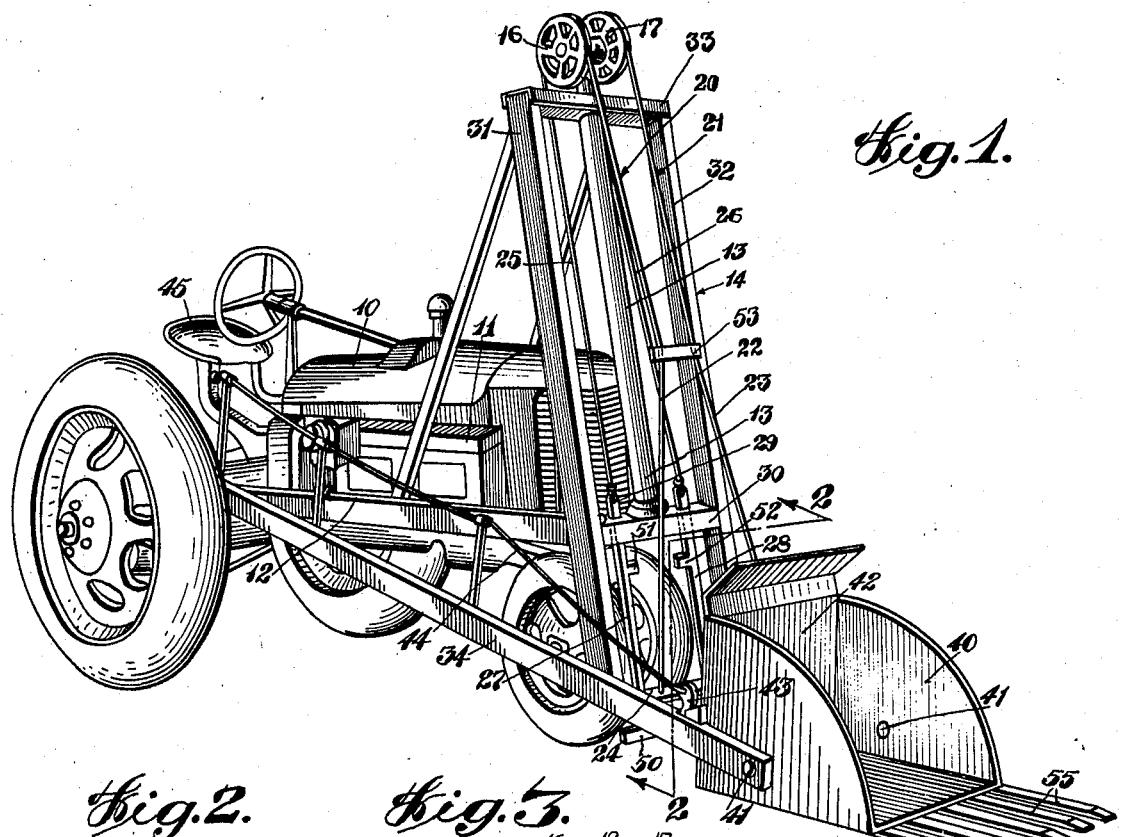
Figure 1 is a view in perspective of the tractor showing the improved hydraulic lift connected thereto for elevating a shovel.
Figure 2:
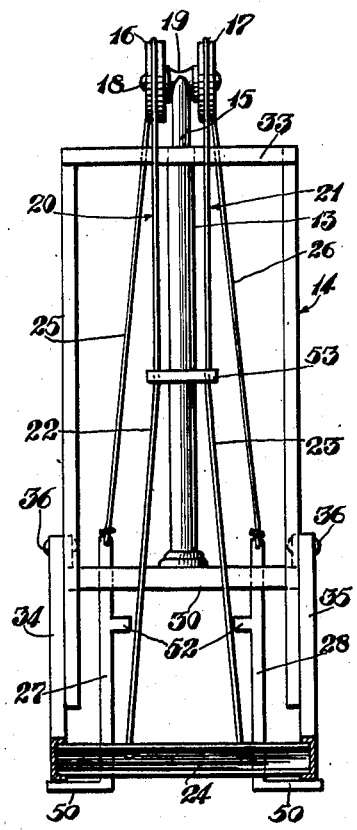
Figure 2 is a transverse vertical section taken along the lines 2—2 of Figure 1.
Figure 3:
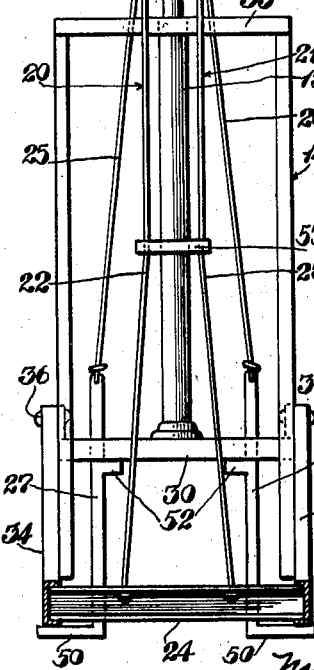
Figure 3 is a transverse section which is the same as that shown in Figure 2, but in which the shovel frame is shown partly raised.
Figure 4:
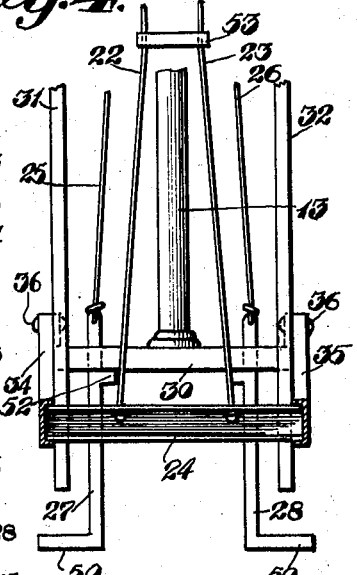
Figure 4 is a fragmentary section similar to the section shown in Figures 2 and 3 disclosing the shovel frame elevated to a greater altitude.

Referring more particularly to the drawings, 10 generally designates a tractor which has the usual internal combustion engine for causing the wheels of the tractor to move the same over the ground. This tractor is also provided with a pump 11 adapted to force a suitable liquid such as oil under pressure through a pipe 12 to the bottom of a cylinder 13 carried by a frame generally designated by the numeral 14.

A piston 15 located in the cylinder 13 is adapted to be elevated by hydraulic pressure and a pair of pulleys 16 and 17 are also elevated by the piston since they are carried by a shaft 18 mounted in a bearing 19 which is secured to the upper end of the piston 15.

A pair of cables, generally designated by the numerals 20 and 21 have their intermediate portions respectively trained on the pulleys 16 and 17. The outer portions 22 and 23 of the cables extend downwardly in front of the frame 14 and are connected at their lower ends to a transverse bar 24.

The opposite or other ends 25 and 26 of the cables extend downwardly at the rear of the frame 14 and are connected respectively to the upper ends of slidably mounted rods 27 and 28 as shown at 29.

The rods 27 are slidable in passages in a transverse bar 30 which is connected to the front of the tractor and which forms part of the frame 14 that includes the uprights 31 and 32 and a top transverse bar 33.

A pair of bars 34, 35 are pivotally mounted to the rear end of the tractor frame as shown at 30. The bar 24 is rigidly connected at its ends to the forward portions of the bars 34 and 35.

A shovel 40 is pivotally mounted at 41 to the outer free ends of the bars 34 and 35 and has its back portion 42 adjacent the transverse bar 24.

A latch 43 is adapted to lock the shovel 40 in an operative position as shown in Figure 1 and is operated by a cable 44 which extends to the driver's seat 45 of the tractor 10. When the latch 43 is released the weight of the shovel and the load will cause the same to tilt for discharging the load.

The lower ends of the rods 27 and 28 are each provided with a lug 50 which projects laterally therefrom and engages beneath the lower edges of the bars 34 and 35. A finger 51 projects inwardly from the bar 27 adjacent its upper end while a finger 52 projects laterally and inwardly from the rod 28 near its upper end and is adapted to engage the under surface of the transverse bar 30 when the rods are elevated and thus limit further movement of said rods for a purpose which will be presently explained.

A cleat 53 is adapted to maintain the upper portions of the sections 22 and 23 of the respective cables 20 and 21 in parallel relation so that they will be held in line with the grooves in the respective pulleys 16 and 17.

The operation of the device shown in Figures 1 to 4, inclusive, is as follows:

When it is desired to remove a pile of material such as manure, sand or dirt, the shovel 40 is placed in the position shown in Figure 1 with the latch 43 operatively retaining the shovel in such position and then the tractor is moved forwardly until the tines 55 project into the material and the shovel is forced through the material and the material is then moved into the shovel per se.

Due to the fact that a number of materials will compact in a mass after having lain in piles for some time, it is difficult to raise the shovel in order to break the material in the pile and in the shovel away from the shovel. At this time considerable force is required to snap the shovel out of its position and, therefore, considerable strain is applied to the cables and to their connections with the basket frame 24. However, in the present construction both ends of the cables have connections with the basket frame so that when hydraulic power is exerted against the piston 15 an upward pressure will be exerted on the intermediate portions of the cables by the pulleys 16 and 17 and both ends of the cables will exert a pull on the pivoted bars 34 and 35 and likewise the shovel 40 and thus the shovel will be rapidly snapped, as it were, out of the pile.

The fingers 51 and 52 are so positioned on the rods 27 and 28 that the shovel 40 will be elevated from the material before these fingers contact the bottom face of the bar 30 of the frame 14. When this happens the rear ends 25 and 26 of the cables will be held stationary while the forward sections 22 and 23 will continue the upward lift of the shovel until the shovel is sufficiently raised for dumping in a truck.

In other words, the strain is equally distributed on both ends of the cables and their connections with the pivoted frame composed of the bars 34 and 35 and the transverse bar 24 during the initial upward movement of the shovel.

In Figures 5 to 8, inclusive, is shown a modified form of the means for lifting the shovel 40 and since the construction of the frame 14 and the frame which pivotally supports the shovel 40 are identical with the construction shown in Figures 1 to 4, inclusive, the same reference numerals will be employed for similar elements in both constructions.

The modified form in Figures 5 to 8, inclusive, is predicated upon the means for permitting both ends of the cables to exert an equal pull on the bars 34 and 35 and likewise an equal lift on the shovel 40 for a short upward movement of the shovel after which the rear portions of the cables are held against movement while the front sections of the cables continues the lift.

Cables 60 and 61 have their intermediate portions trained on pulleys 16 and 17 while the lower ends of the forward sections 62 and 63 of the cables are connected at the lower ends of the transverse bar 24 which is connected to the pivoted bars 34 and 35.

A movable transverse bar 64 is slidable at the rear of the uprights 31 and 32 of the frame 14. The lower ends of these rear sections are rigidly connected to the transverse bar 30 of the frame 14 as shown at 67.

An intermediate portion of the sections 65 and 66 of the cables are connected at 68 to the movable bar 64. Any form of connection may be employed, but in Figure 9 I have shown a pair of bosses 70 with each boss having a vertical passage 71 to receive the sections 65 and 66 of the cables. A set screw 72 is threaded into a horizontal passage in the boss 70 for clamping the cables to the bars 64.

The lower portions 74 and 75 of the rear sections 56 and 66 respectively are shown slack in Figures 5 and 6 when the shovel 40 is at its lowermost position.

The portions 74 and 75 of the rear sections 65 and 66 of the cables are shown slack while a pair of cables or chains 76 and 77 are taut. The last-mentioned cables or chains connect the movable bar 64 with the bar 24 that in turn is rigidly connected with the pivoted bars 34 and 35 that carry the shovel 40.

The operation of the modified form of the device is as follows:

When hydraulic power is applied to the piston 15 it is elevated together with the pulleys 16 and 17 so that a pull is exerted on the cables and this pull is extended to the opposite ends of said cables so that the cables throughout their full length together with their opposite ends are pulling upwardly on the bars 34 and 35 through the medium of the movable bar 64 and the cables or chains 76, 77. This type of pull continues until the shovel has become dislodged from the mass of material and until the portions 74 and 75 of the cables become taut and, therefore, prevent further upward movement of the bar 64. When this happens the rear ends of the cables are maintained against further upward movement and the front sections 65 and 66 continue the upward lift of the bars 34 and 35 and the shovel 40.

The cables or chains 76 and 77 are of sufficient length to permit the shovel 40 to be elevated to the proper height and these cables or chains remain slack during the continued upward movement of the shovel as shown more particularly in Figure 8.

By this particular construction it is possible to employ a smaller piston 15 and cylinder 13 and thus provide for a faster actuation of the lift while employing the normal size shovel or basket 10. On the other hand, when the improvement is applied to a standard lift assembly a larger sized shovel or basket may be used.

I claim:

1. In a loading machine having an hydraulic lift provided with pulleys thereon, a frame pivoted at one end on the machine, a shovel secured to the free end of the frame, a cable trained intermediate the ends thereof on each pulley, one end of each cable being secured to the frame adjacent the shovel, means slidably mounted for limited movement on the machine and having connections at the lower end thereof with the frame, the upper end of said means being connected to the other ends of the cables, cooperating means on the slidable means and frame for limiting movement of the slidable means, and means for operating the lift, both ends of the cables exerting an upward pull on the frame and shovel until the cooperating means retains the slidable means against further movement.

2. In a loading machine having an hydraulic lift provided with pulleys thereon, a frame pivoted at one end on the machine, a shovel secured to the free end of the frame, a cable trained intermediate the ends thereof on each pulley, one end of each cable being secured to the frame adjacent the shovel, a rod slidably mounted for limited movement at each side of the machine and having connections at the lower end thereof with the frame, the upper end of each rod being connected to an end of one of the cables, cooperating means on the slidable rod and frame for limiting movement of the slidable rod, and means for operating the lift, both ends of the cables exerting an upward pull on the frame and shovel until the cooperating means retains the slidable rods against further movement.

3. In a loading machine having an hydraulic lift provided with pulleys thereon, a frame pivoted at one end on the machine, a shovel secured to the free end of the frame, a cable trained intermediate the ends thereof on each pulley, one end of each cable being secured to the frame adjacent the shovel, spaced rods slidably mounted for limited movement on the machine, each rod having a lug engaging beneath the frame, the upper end of each rod having connections with an end of one of the cables, a finger projecting from the rods and adapted to engage a fixed part of the machine for preventing further movement of the rods, and means causing the lift to raise the pulleys and cables so that both ends of the cables will exert a lift on the frame and shovel until the fingers engage the fixed part of the frame when the first-mentioned ends of the cables will continue the lifting of the shovel.

4. In a loading machine having an hydraulic lift provided with pulleys thereon, a frame pivoted at one end on the machine, a shovel secured to the free end of the frame, a cable being trained intermediate the ends thereof on each pulley, one end of each cable being secured to the frame adjacent the shovel, a transverse bar slidably mounted for limited movement on the machine and having connections with the other ends of the cables and the free end of the frame, means having connections with the machine and bar for limiting movement of the bar vertically, and means causing the lift to raise the pulleys, cables and bar so that both ends of the cables will exert a simultaneous lift on the shovel until the bar is limited in movement when continued operation of the lift will cause the first-mentioned ends of the cable to continue the lifting of the shovel.

5. In a loading machine having an hydraulic lift provided with pulleys thereon, a frame pivoted at one end on the machine, a shovel secured to the free end of the frame, a cable being trained intermediate the ends thereof on each pulley, one end of each cable being secured to the frame adjacent the shovel, a transverse bar slidably mounted for limited movement on the machine and having connections with the other ends of the cables and the free end of the frame, cables having connections between the bar and a fixed part of the machine, said cables remaining slack during part of the lift of the shovel thereby permitting both ends of the cables to exert a lift on the shovel, said chains when taut retaining the bar and the second-mentioned ends of the cable against further movement, and means causing the lift to elevate the pulleys and cables.

6. In a loading machine having an hydraulic lift provided with pulleys thereon, a frame pivoted at one end on the machine, a shovel secured to the free end of the frame, a cable trained intermediate the ends thereof on each pulley, one end of each cable being secured to the frame adjacent the shovel, a transverse bar having limited vertical movement, a slack flexible means connecting said bar with a fixed part of the machine to permit the bar to be drawn upwardly for a limited distance and to retain the bar against further movement, the other ends of the cables being secured to said bar, flexible means connected between the free end of the frame and the transverse bar, and means for operating the lift, both ends of the cables exerting an upward pull on the frame until the first flexible means becomes taut when the second-mentioned ends of the cables will be retained against further movement.

RICHARD R. LOVE.